United States Patent [19]

Braid

[11] 4,420,579
[45] * Dec. 13, 1983

[54] ANTIOXIDANT COMPOSITIONS

[75] Inventor: Milton Braid, Westmont, N.J.

[73] Assignee: Mobil Oil Corporation, New York, N.Y.

[*] Notice: The portion of the term of this patent subsequent to Apr. 15, 1997 has been disclaimed.

[21] Appl. No.: 338,452

[22] Filed: Jan. 8, 1982

Related U.S. Application Data

[63] Continuation of Ser. No. 1,662, Jan. 8, 1979, abandoned, which is a continuation-in-part of Ser. No. 901,938, May 1, 1978, Pat. No. 4,198,303.

[51] Int. Cl.³ .............................................. C08K 5/36
[52] U.S. Cl. .................................................. 524/328
[58] Field of Search ........................................ 524/328

[56] References Cited

U.S. PATENT DOCUMENTS

| | | | |
|---|---|---|---|
| 2,703,786 | 3/1955 | Young et al. | 252/42.7 |
| 2,971,940 | 2/1961 | Fuchsman et al. | 260/45.75 N |
| 3,006,885 | 10/1961 | Dickson | 260/45.75 N |
| 3,867,340 | 2/1975 | Rasberger et al. | 260/45.75 N |
| 4,013,620 | 3/1977 | Henderson et al. | 524/328 |
| 4,026,866 | 5/1977 | Rasberger et al. | 260/45.75 N |
| 4,198,303 | 4/1980 | Braid . | |

*Primary Examiner*—Veronica P. Hoke
*Attorney, Agent, or Firm*—Alexander J. McKillop; Michael G. Gilman; Howard M. Flournoy

[57] ABSTRACT

Nickel thiobis(alkylphenolates) complexed with hydroxy ligands impart antioxidant properties to polyolefin plastic when incorporated therein.

2 Claims, No Drawings

ANTIOXIDANT COMPOSITIONS

This is a continuation of copending application Ser. No. 001,662, filed Jan. 8, 1979, now abandoned which is a continuation-in-part of U.S. Ser. No. 901,938, filed May 1, 1978, now U.S. Pat. No. 4,198,303.

BACKGROUND OF THE INVENTION

1. Field of the Invention

This invention relates to compositions comprising nickel (II) thiobis(alkylphenolates) complexed with hydroxyl-substituted ligands and polyolefinic polymers. Said compositions contain a minor amount of said nickel thiobis(alkylphenolate) complex sufficient to impart antioxidant and ultra-violet stabilization thereto and a major amount of said polyolefinic polymers. Polyolefin plastic compositions normally require the presence of stabilizing agents to inhibit oxidative degradation catalyzed inter alia by ultra-violet and/or visible light, or other high energy conditions.

2. Description of the Prior Art

Commercially available ultra-violet stabilizers are listed by class and function and identified as to structure in the Kirk-Othmer Encyclopedia in "Encyclopedia of Chemical Technology"; Second Edition, Vol. 21, pp. 115–122. U.S. Pat. No. 3,832,304 discloses the use of aromatic azo compounds for stabilizing hydrocracked oils. U.S. Pat. Nos. 2,703,786; 2,716,090 and 3,210,277 disclose the use of polyvalent metal, e.g., Ni salts of thiobis(alkylphenols) as oxidation inhibitors and plasticizing agents. Nickel thiobis-(4-t-octylphenolate) is disclosed in U.S. Pat. No. 2,971,940 as a stabilizer for plastics, and complexes thereof with amines, e.g., n-butylamine are disclosed in U.S. Pat. No. 3,215,717 as a plastic stabilizer. However, none of the foregoing disclosures are directed to compositions containing the organosulfur-nickel complexes described in accordance with this invention. Further, the subject complexes with hydroxy-substituted ligands are not disclosed by any prior art known to applicant. Accordingly, their use in plastics to impart resistance to oxidative and other similarly induced degradation is also believed to be novel. The complexes in accordance herewith in combination with co-antioxidants such as hindered phenols show an even more remarkable degree of improvement in controlling oxidative degradation. Also useful as co-antioxidants are diarylamines and phenothiazines.

SUMMARY OF THE INVENTION

This application is based on the discovery that the coordination complexes of Ni thiobis(alkylphenolates) with hydroxy-substituted ligands disclosed herein have antioxidant characteristics superior to the nickel thiobis-(alkylphenolates) of the prior art. For example, the nickel complexes of U.S. Pat. No. 2,971,940, or the nickel complexes with amino-substituted ligands of U.S. Pat. No. 3,219,717. The complexes in accordance with this invention also possess superior UV and/or visible light stabilization and energy quenching characteristics. As mentioned herein above they form synergistic and/or improved antioxidant combinations with co-additives such as diarylamines and/or hindered phenols.

This application is therefore directed to compositions comprising a major proportion of a polyolefin plastic medium normally suceptible to oxidative degradation and a minor amount sufficient to impart antioxidant properties and/or ultra-violet stabilization thereto of the herein embodied nickel complexes.

DESCRIPTION OF THE SPECIFIC EMBODIMENTS

The nickel thiobis(alkylphenolates) useful in this invention have the following general structure:

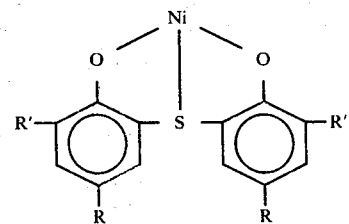

where each R is either hydrogen or an alkyl group having from 1 to about 30 carbon atoms. Especially preferred are those compounds wherein R is an alkyl group of from 4 to about 16 carbon atoms. Most preferred is an alkyl group having 8 carbon atoms, e.g., 4-t-octyl or 1,1,3,3-tetramethylbutyl. R' is hydrogen or an alkyl group containing from 1 to about 8 carbon atoms in any isomeric arrangement except those in which the carbon atom bonded to a ring carbon atom is bonded in turn to more than two other carbon atoms. Preferred are those compounds in which R' is hydrogen, methyl and n-butyl. Most preferred is hydrogen.

The organosulfur-containing complexes of nickel II thiobis(alkylphenolates) with hydroxy-substituted ligand in accordance with the invention have the following general structure:

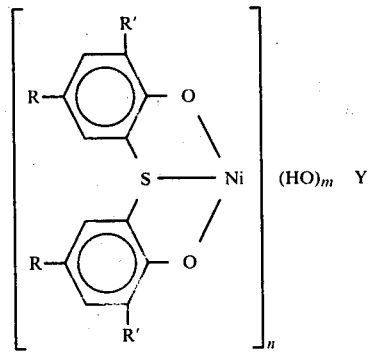

wherein R and R' are as defined above and Y is an alkyl, alkylene, aralkyl, alkaryl or alkylene aryl group having from 1 to about 40 carbon atoms, n is from 1 to 4 and m is from 1 to 6 with the proviso that m is never less than n.

Any suitable hydroxy-substituted ligand may be used to form the coordination complexes. A non-exhaustive list includes methanol, ethanol, propanol, 2-propanol, n-butanol, isobutyl alcohol, benzyl alcohol, 3,5-di-tertiary-butyl-4-hydroxybenzyl alcohol, phenol, 1,4-butanediol, 1,6-hexamethylenediol, 1-8-octamethylenediol, 1,4-cyclohexanedimethanol and the like.

Particularly preferred are alcohols having from 1 to about 4 carbon atoms such as methanol, ethanol, propanol, 2-propanol, butanols, and phenol.

The hydroxy-substituted nickel complexes of this invention may be conveniently prepared by reacting a nickel thiobis(alkylphenol-phenolate) with a suitable hydroxy ligand, e.g., 2-propanol. The reaction mixture is heated to reflux, filtered and the resultant hydroxy-substituted complex recovered (see Example 4). However, the hydroxy-substituted complexes may be also prepared by exchanging or displacing one hydroxy ligand for another. For example a [thiobis(alkylphenolato)]-butanol nickel may be prepared from [thiobis(alkylphenolato)]-2-propanol nickel by displacement of the 2-propanol moiety for a butanol moiety (see Example 6).

The organosulfur-containing hydroxy-substituted nickel complexes in accordance with the invention can be effectively employed in any amount which is sufficient for imparting to the organic medium, e.g., polybutene, the desired degree of protection against oxidative degradation. In many instances, the complex is effectively employed in an amount from about 0.01 to about 5%, by weight, and preferably in an amount from about 0.1 to about 2%, by weight, of the total weight of the composition being given anti-oxidation protection. As hereinbefore indicated, the nickel organosulfur-containing hydroxy-substituted ligand nickel complexes may be incorporated into any organic media normally subject to oxidative degradation, for example oils of lubricating viscosity or polyolefin plastics.

The polyolefins utilizable in the compositions of this invention include the commercially available low, medium, and high density polyolefins, e.g., polypropylenes as well as homopolymers and copolymers of $C_2$-$C_4$ olefins. The latter are readily prepared by using the well known Natta-Ziegler stereospecific catalysts, such as $TiCl_3$ and an aluminum alkyl, and most are available commercially.

Suitable arylamine co-antioxidants useful herein are preferably selected from the group consisting of the following: N-phenyl-1-naphthylamine; N-(4'-t-octylphenyl)-1-naphthylamine; N-phenyl-2-naphthylamine; 4,4'-thiobis(N-phenyl-1-naphthylamine); 1,1'-thiobis(N-phenyl-2-naphthylamine); diphenylamine; 4,4'-di-t-octyldiphenylamine; dinaphthylamine; 4-decoxydiphenylamine and phenothiazine. Especially preferred are phenyl naphthylamines such as N-phenyl-1-naphthylamine, N-(4-t-octylphenyl)-1-naphthylamine and N-phenyl-2-naphthylamine. However, it is understood that this is a non-limiting list and any arylamine or diarylamine appropriate in view of those disclosed above may be used.

Suitable hindered phenolic compounds useful herein as a co-antioxidant are preferably selected from the following non-exhaustive list: 2,6-di-t-butyl-p-cresol; 4,4'-methylenebis-(2-6-di-t-butyl-m-cresol); 4,4'-butylidenebis-(6-t-butyl-m-cresol); 4,4'-methylenebis-(2,6-di-t-butylphenol); 2,6-di-t-butylphenol, tetratrakis [methylene 3-(3'5'-di-t-butyl-4-hydroxyphenyl) propionate] methane. 2,4,6-tri-t-butylphenol. Especially preferred are 4,4'-methylenebis-(2,6,di-t-butylphenol) and tetrakis[methylene 3-(3',5'-di-t-butyl-4-hydroxyphenyl)-propionate]methane.

Generally the weight ratio of nickel complex to co-additive is from about 0.01-5.0 to 1.

The following examples are not meant to be limiting but to merely exemplify the invention as embodied herein.

EXAMPLE 1

Stabilizer free polypropylene (Profax 6501), obtained commercially.

EXAMPLE 2

Nickel 2,2'-thiobis-(4-t-(octylphenolate), (Ni TBP); its preparation is described in U.S. Pat. No. 2,971,940.

EXAMPLE 3

[2,2'-thiobis-(4-t-octyl-phenolato)]-n-butylamine Nickel, (NI TBP.$C_4H_9NH_2$), was obtained commercially. Its method of preparation and structure is described in U.S. Pat. No. 3,215,717.

EXAMPLE 4

[2,2'-thiobis-(4-t-octyl-phenolato)]-2-propanol Nickel (II), NiTBP.i-$C_3H_7OH$, was prepared as follows: One hundred fifty grams of nickel 2,2'-thiobis-(4-t-octylphenol phenolate) (purchased commercially and manufactured in accordance with U.S. Pat. No. 2,971,940), melting range of 147°–149° C., was added to about 650 ml. of 2-propanol. The mixture was then heated while stirring. As the reaction temperature approached 85° C. all of the solids dissolved. After refluxing for about $\frac{1}{4}$ to $\frac{1}{2}$ hr. solids again began to precipitate. The reaction mixture became progressively more turbid and after 1.5 hr. of refluxing the hot mixture was filtered and the solids collected and dried. 75.7 g. of a light green colored solid with a melting point higher than 300° C. were obtained. Elemental analysis of the solids prepared in this way corresponded to the nickel 2,2'-thiobis-(4-t-octylphenolate) complex with 2-propanol [2,2'-thiobis(4-t-octylphenolato)]-2-propanol nickel II.

Anal. Calcd. for $C_{31}H_{98}O_3S$ Ni: C, 66.6; H, 8.7; S, 5.7; Ni, 10.49: Found: C, 65.0; H, 8.5; S, 5.8; Ni, 10.52.

Nickel was determined by thermogravimetric analysis which also established the ratio of one 2-propanol ligand to one nickel thiobis (alkylphenolate) moiety:

Calcd.: % 2-$C_3H_7OH$: 10.74; Found: 10.59.

EXAMPLE 5

[2,2'-thiobis-(4-t-octylphenolato)]-2-propanol nickel II (83.9 g.) prepared as described in Example 4 was added to 250 g. of 1-butanol and the mixture was heated to reflux, but the 2-propanol complex was mostly insoluble. After refluxing for 1.25 hr. most of the solids had dissolved. A total of 150 ml. of 1-butanol plus 2-propanol were distilled from the mixture and the remainder was filtered to remove solids. From the filtrate upon cooling, there was obtained by collecting the precipitated solids the complex [2,2'-thiobis-(4-t-butyl-phenolato]-1-butanol nickel II, a green solid melting point >300° C.

Anal. Calcd. for $C_{32}H_{50}O_3S$ Ni: C, 67.02; H, 8.79; S, 5.59; Ni, 10.24; Found: C, 66.90; H, 8.79; S, 5.52; N, 9.75.

EXAMPLE 6

[2,2'-thiobis-(4-t-octyl-phenolato)]-ethanol Nickel, Ni-TBP.$C_2H_5OH$ was prepared as follows: Nickel 2,2'-thiobis-(4-t-octylphenol-phenolate), prepared as in U.S. Pat. No. 2,971,940, (103 g.) was dissolved in 450 ml. of petroleum ether by warming to 35° C. The solution was cooled to 25° C. The addition thereto of ethanol was begun as petroleum ether was removed by distillation. The temperature of the reaction mixture was then raised to 50° C. During 1.5 hr. 400 ml. of ethanol were added and 450 ml. of petroleum ether had been removed. The hot reaction mixture was then filtered to collect the solids which had precipitated during the reaction. There was thus obtained 49 g. of the powdery light green complex [2,2'-thiobis-(4-t-octylphenolato)]-ethanol nickel II, melting higher than 300° C.

Anal. Calcd. for $C_{30}H_{46}O_3S$ Ni: S, 5.88; Ni, 10.76; Found: S, 6.05; Ni, 10.0

EXAMPLE 7

[2,2'-thiobis-(4-t-octylphenolato)]-methanol Nickel (II) NiTBP.CH₃OH was prepared as follows: Nickel 2,2'-thiobis-(4-t-octylphenol-phenolate) prepared as described in U.S. Pat. No. 2,971,940 (103 g.) was dissolved in warm petroleum ether, bp. 30°-60° (400 ml) and while stirring methanol (10 ml) was added at a rate sufficiently slow as to control the frothing of solvent generated by the resulting exothermic reaction. Additional methanol was then added while the mixture was heated to boil off the petroleum ether until solvent exchange was complete. The green solids which began to precipitate with the first methanol addition increased in amount throughout the reaction period and were collected by filtration of the hot methanolic reaction mixture. The complex [2,2'-thiobis-(4-t-octylphenolato)]methanol nickel II was thus obtained as a light green powdery solid melting higher than 300°.

EXAMPLE 8

[2,2'-thiobis-(4-t-octyl-phenolato)]-benzyl alcohol Nickel II, NiTBP.C₆H₅OH was prepared as follows: [2,2'-thiobis-(4-t-octylphenolato)]-2-propanol nickel II prepared as described in Example 4 (84.9 g.) was dissolved in benzene (250 ml) and benzyl alcohol (16.2 g.) was then added. The resulting solution was heated and refluxed for one hour. The displaced 2-propanol and most of the benzene solvent was then removed by distillation and the remainder by rotary evaporation. The complex [2,2'-thiobis-(4-t-octylphenolato)]-benzyl alcohol nickel II was thus obtained as a green solid which softened at 150° C., melted partially at 210° C. and was completely fused at 260° C.

Anal. Calcd. for $C_{35}H_{48}O_3S$ Ni: S, 5.3; Ni, 9.7; Found: S, 5.4; Ni, 8.5.

EXAMPLE 9

[2,2'-thiobis-(4-t-octylphenolato)]-phenol Nickel II as described in Example 4 (28 g.) and phenol (60 g.) were heated together at 100°-110° C. for several hours. The reaction mixture was then cooled, treated with water and filtered. The solids collected were then washed several times with water to complete removal of unreacted phenol. The complex [2,2'-(4-t-octylphenolato)]-phenol nickel II was obtained as a green solid m.p. higher than 300° C.

EXAMPLE 10

[2,2'-thiobis-(4-t-octylphenolato)]-2-propanol nickel II (83.9 g.) prepared as described in Example 4 was dissolved in benzene (250 ml), 1,8-octanediol (22.8 g.) was added and the mixture was heated to reflux temperature. The resulting clear solution was refluxed for about 1 hr. and near the end of this period the mixture became cloudy. The reaction mixture was then cooled and filtered. The complex bis-[2,2'-thiobis-(4-t-octylphenolato)]-(1,8-octanediol) dinickel II was thus obtained as a green solid melting over the range 136°-145° C.

Anal. Calcd. for $C_{64}H_{98}O_6S_2Ni_2$: C, 67.15; H, 8.63; Found: C, 67.29; H, 9.04.

EXAMPLE 11

[2,2'-thiobis-(4-t-octylphenolato)]-2-propanol nickel II (83.9 g.) prepared as described in Example 4 was dissolved in benzene (250 ml) and the solution was heated to reflux temperature. 1,6-hexanediol (8.86 g.) was dissolved in the refluxing solution and the reaction mixture was refluxed for about 2 hrs. before displaced 2-propanol and benzene solvent were distilled from the reaction vessel. After 100 ml. of benzene was removed, the reaction mixture was cooled and the solids were collected by filtration. The complex bis-[2,2'-thiobis-(4-t-octylphenolate)]-(1,6-hexanediol) dinickel II was obtained as a green solid melting higher than 300° C.

Analy. Calcd. for $C_{62}H_{94}O_6S_2Ni_2$: C, 66.69; H, 8.48; S, 5.74; Found: C, 68.11; H, 8.25; L S, 5.10.

EXAMPLE 12

[2,2'-thiobis-(4-t-octylphenolato)]-2-propanol nickel II (83.9 g.) prepared as described in Example 4 was dissolved in benzene (250 ml) and the solution was heated to reflux. To the refluxing solution 1,4-cyclohexanedimethanol (10.8 g.) was added. The reaction mixture became progressively more cloudy during the ensuing 2 hr. reflux period. Displaced 2-propanol and benzene (100 ml) were then removed by distillation. The hot reaction mixture was filtered to collect the product complex bis-[2,2'-t-octylphenolato)]-(1,4-cyclohexanedimethanol) dinickel II as a green solid melting higher than 300° C.

Anal. Calcd. for $C_{64}H_{96}O_6S_2Ni_2$: C, 67.27; H, 8.47; S, 5.61; Ni, 10.25; Found: C, 67.13; H, 8.52; S, 5.35; Ni, 9.5.

EXAMPLE 13

A hindered phenol of the following structure, tetrakis [methylene 3-(3'-5'-di-t-butyl-4'-hydroxyphenyl)propionate] methane:

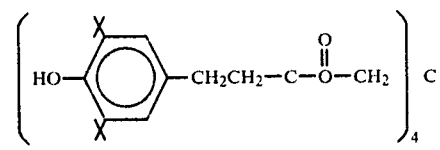

wherein the symbol "+" represents a tertiary butyl group

Several of the additive compounds prepared or commercially obtained in accordance with the above specification were tested for antioxidation stability by admixing with a commercial polyolefin polymer and testing as described below in a Weather-Ometer.

TABLE 1

| Additive[1] | Experimental Results | | |
|---|---|---|---|
| | Weather-Ometer,[2] hours | OLT,[3] ° | OLT,[4] min. |
| Example 1 (Additive-free polymer) | — | 184 | 0 |
| Example 3 | 1550 | 207 | 6.3 |
| Example 4 | 1240 | 212 | 12.1 |
| Example 4 (0.1%) Plus Ex. 1 (99.9%) | — | 214 | — |
| Example 5 | 1200 | 217 | 11.2 |
| Example 7 | 1430 | 217 | 11.3 |

TABLE 1-continued

| | Experimental Results | | |
|---|---|---|---|
| Additive[1] | Weather-Ometer,[2] hours | OLT,[3] ° | OLT,[4] min. |
| Example 8 | 1520 | 215 | 12.1 |

[1]All samples were prepared from stabilizer free polypropylene; Profax 6501. Example 14, a phenolic antioxidant, was introduced to the polymer powder as a 1% acetone solution. After stirring and drying of all acetone, the UV-stabilizers antioxidants were melt-blended in a Brabender Plasticorder for 7 min at 50 rpm. Except as noted, all samples contained 0.1 php (parts per hundred of polymer) plus 0.25 php UV-stabilizer.
[2]Samples of 10 mil thickness were exposed in an Atlas 600 WRC (xenon lamp) Weather-Ometer and the carbonyl development monitored every 100 hours by infrared measurements. A change in carbonyl extinction of 0.40 units was taken as the failure criterion. This approximates about a 50% loss of tensile properties for polypropylene of this thickness.
[3]Temperature at which the oxidative exotherm occurs under conditions of heating at 10° C./min. in pure oxygen.
[4]Time to oxidative exotherm in pure oxygen at 190° C.

The data tabulated in the Table clearly demonstrates the utility of this invention as an antioxidant in polyolefins. As noted from the Table, the antioxidant characteristics of the present invention, i.e., novel complexes of nickel (II) thiobis(alkylphenolates) with hydroxy-substituted ligands, alone or in combination with other antioxidants, have proven in direct comparison with prior art antioxidants to be highly effective.

While this invention has been described with reference to preferred compositions and components therefor, it will be understood by those skilled in the art that departure from the preferred embodiments can be effectively made and are within the scope of the specification.

What is claimed is:

1. A composition comprising a major proportion of a $C_2$–$C_4$ polyolefin polymer normally susceptible to oxidative degradation and a minor amount sufficient to impart antioxidant properties and/or ultra-violet or visible light stabilization thereto of an additive mixture consisting essentially of a nickel organosulfur-containing hydroxy complex having the following general structure

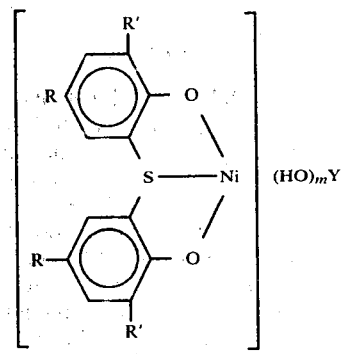

where each R is hydrogen or an alkyl group having from 1 to about 30 carbon atoms, each R' is hydrogen or an alkyl group containing from 1–8 carbon atoms in any isomeric configuration except those in which a carbon atom bonded to a ring carbon atom is in turn bonded to more than two other carbon atoms, Y is an alkyl, alkylene, aralkyl, or alkylene aryl group having from 1 to about 40 carbon atoms and n is from 1 to 4 and m is from 1 to 6 with the provision that m is never less than n and a hindered phenol selected from 2,6-di-t.butyl-p-cresol, 4,4'-methylenebis-(2,6-di-t.butyl-m-cresol), 4,4'-butylidenebis-(6-t.butyl-m-cresol), 4,4'-methylenebis-(2,6-di-t-butylphenol), 2,6-di-t.butylphenol, tetrakis [methylene 3-(3',5'-di-t.butyl-4-hydroxyphenyl) propionate] methane, 4,4'-butylidenebis-(2,6-di-t.butylphenol), 2,4,6-tri-t-butyl phenol and/or an arylamine.

2. The composition of claim 1 in which the hindered phenol is tetrakis [methylene 3-(3',5-di-t-butyl-4-hydroxy-phenyl) propionate] methane.

* * * * *